(12) United States Patent
Oertel

(10) Patent No.: US 11,846,561 B2
(45) Date of Patent: Dec. 19, 2023

(54) DETERMINING THE TRANSMISSION QUALITY OF AN OPTICAL UNIT IN A CAMERA SYSTEM

(71) Applicant: Siemens Mobility GmbH, Munich (DE)

(72) Inventor: Norbert Oertel, Gotha (DE)

(73) Assignee: Siemens Mobility GmbH, Munich (DE)

( * ) Notice: Subject to any disclaimer, the term of this patent is extended or adjusted under 35 U.S.C. 154(b) by 355 days.

(21) Appl. No.: 17/416,609

(22) PCT Filed: Nov. 18, 2019

(86) PCT No.: PCT/EP2019/081585
§ 371 (c)(1),
(2) Date: Jun. 21, 2021

(87) PCT Pub. No.: WO2020/126250
PCT Pub. Date: Jun. 25, 2020

(65) Prior Publication Data
US 2022/0082471 A1 Mar. 17, 2022

(30) Foreign Application Priority Data
Dec. 18, 2018 (DE) ..................... 10 2018 222 140.5

(51) Int. Cl.
*H04N 7/18* (2006.01)
*G01M 11/02* (2006.01)
(Continued)

(52) U.S. Cl.
CPC .... *G01M 11/0278* (2013.01); *G01M 11/0285* (2013.01); *G01N 21/94* (2013.01);
(Continued)

(58) Field of Classification Search
CPC .......... G01M 11/0278; G01M 11/0285; H04N 7/18; H04N 25/61; H04N 17/002; G01N 21/94; G01N 2021/157; G06T 7/0002
(Continued)

(56) References Cited

U.S. PATENT DOCUMENTS 5,717,781 A * 2/1998 Ebel ..................... G01M 11/025
356/124
8,982,263 B2 * 3/2015 Cazier .................... H04N 25/61
348/135
(Continued)

FOREIGN PATENT DOCUMENTS

EP 2352293 A1 8/2011
WO WO03050472 A1 6/2003

OTHER PUBLICATIONS

Hong-Dar Lin et al: "A visual inspection system for quality control of optical lenses", International Journal of the Physical Sciences, 2011, pp. 2701-2709; XP055656488; DOI: 10.5897/IJPSII.540 URL:http://www.academicjournals.org/app/webroot/article/article1380714216 Lin%20et%20al.pdf; 2011;.

*Primary Examiner* — Trang U Tran
(74) *Attorney, Agent, or Firm* — Laurence A. Greenberg; Werner H. Stemer; Ralph E. Locher

(57) ABSTRACT

A method for determining the transmission quality of an optical unit in a camera system to draw conclusions about dirt and/or wear in the optical unit and particularly to determine whether the optical unit requires servicing, includes transforming spatially resolved information relating to at least one image from the camera system sectionally using a frequency transformation so that a sequence of transformation coefficients is determined for each section of the at least one image. Each transformation coefficient is a measure of the energy in a specific frequency range. At least one sequence of transformation coefficients having the high-
(Continued)

est energy values for the highest frequencies is selected. Using the at least one selected sequence a distribution of the frequencies is determined, the distribution of the frequencies is compared with a reference, and the transmission quality of the optical unit is determined using the comparison.

20 Claims, 2 Drawing Sheets

(51) Int. Cl.
*G01N 21/94* (2006.01)
*G06T 7/00* (2017.01)
*H04N 17/00* (2006.01)
*H04N 25/61* (2023.01)
*G01N 21/15* (2006.01)

(52) U.S. Cl.
CPC ......... *G06T 7/0002* (2013.01); *H04N 17/002* (2013.01); *H04N 25/61* (2023.01); *G01N 2021/157* (2013.01); *G06T 2207/30168* (2013.01)

(58) Field of Classification Search
USPC .......................................................... 348/148
See application file for complete search history.

(56) References Cited

U.S. PATENT DOCUMENTS

| | | | |
|---|---|---|---|
| 9,319,637 B2* | 4/2016 | Lu | H04N 7/18 |
| 9,445,057 B2* | 9/2016 | May | G06T 7/70 |
| 10,003,738 B2* | 6/2018 | Lautenbach | G08B 6/00 |
| 10,191,356 B2* | 1/2019 | Laroia | G02B 27/0006 |
| 10,225,445 B2* | 3/2019 | Lautenbach | F21V 23/003 |
| 10,491,806 B2* | 11/2019 | Lai | H04N 23/667 |
| 10,715,705 B2* | 7/2020 | Zhang | H04N 23/60 |
| 2003/0219172 A1 | 11/2003 | Caviedes et al. | |
| 2009/0278950 A1 | 11/2009 | Deng et al. | |
| 2017/0011507 A1* | 1/2017 | Wong | G01M 11/0278 |

\* cited by examiner

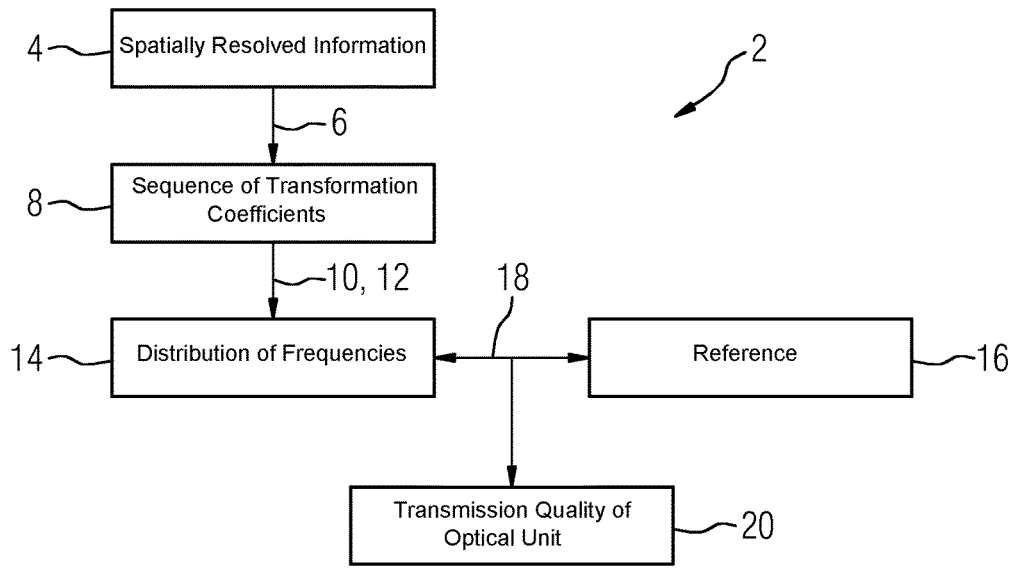
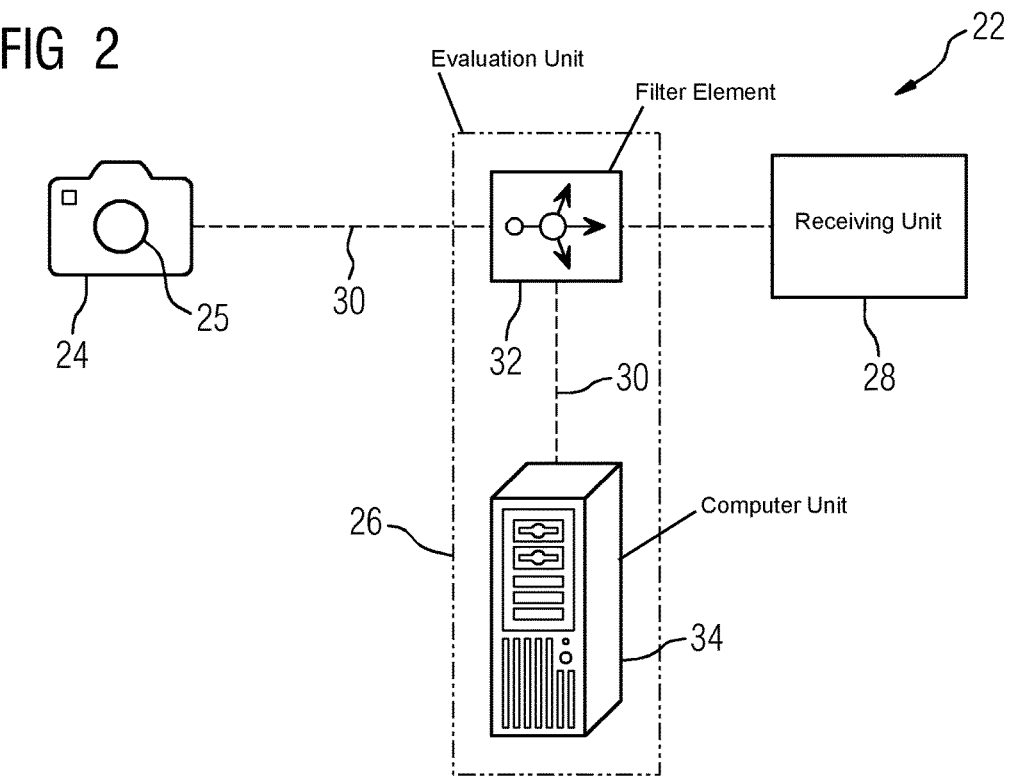

DETERMINING THE TRANSMISSION QUALITY OF AN OPTICAL UNIT IN A CAMERA SYSTEM

BACKGROUND OF THE INVENTION

Field of the Invention

The invention relates to a method for determining a transmission quality of an optical unit in a camera system.

Camera systems are being used increasingly to monitor specific technical components partially or fully automatically and/or to monitor spaces or venues and the people present therein and/or residing there.

The recorded images are generally compressed by the camera system by means of a video compression and transmitted. In this process an image can be compressed per se. In order to compress entire image sequences, it is moreover typical to acquire changes within the images in relation to preceding images and only to transmit these.

In order to compress an image, it is firstly shown by means of a brightness chromaticity color model (e.g. YUV model, YCbCr model etc.). If the image is present in the RGB color model, for instance, a conversion into the brightness chromaticity color model is therefore required. The image is divided into a number of sections. One section can comprise 8×8 pixels or 16×16 pixels, for instance. The spatially resolved information of each section is transformed by means of a frequency transformation into the frequency space. The transformed information can then be quantified using quantification coefficients. The coefficients of the resulting matrix are then sorted according to their frequency. In order to sort the coefficients, the matrix is run through in a zigzag fashion along its counterdiagonal. A sequence of transformation coefficients results for each section. The transformation coefficients are present in the respective sequence sorted according to the frequency.

A respective transformation coefficient, in particular its amount, is in each case a measure of an energy value in a specific frequency range, also frequency band.

The compressed image information can then be transmitted by the camera system to a receiver. The receiver decompresses the received image information again so that the images can be shown and possibly evaluated.

One problem is that the optical unit of the camera system, in particular a safety screen of the optical unit, is contaminated and/or worn over time by abrasion, by dirt deposits and/or by other environmental influences, so that the quality of the images recorded by the camera system deteriorates over time. In this case, the optical unit, in particular the safety screen, must undergo servicing, for instance be cleaned, polished or replaced.

A fixed servicing interval is generally defined, which is independent of the tangible contamination and/or wear and thus independent of the tangible need for servicing. Moreover, it is also possible to manually ascertain that the image quality is no longer adequate and servicing must be carried out.

SUMMARY OF THE INVENTION

One object of the invention is to specify a method, with the aid of which conclusions can be drawn about contamination and/or wear in the optical unit, particularly to determine whether the optical unit requires servicing.

The object is achieved by a method for determining a transmission quality of an optical unit of a camera system, in which, in accordance with the invention, spatially resolved information relating to at least one image from the camera system is transformed section by section using a frequency transformation so that a sequence of transformation coefficients is determined for each section of the at least one image, wherein each transformation coefficient is a measure of an energy value in a specific frequency range. In particular, the amount of each transformation coefficient can be in each case a measure of the energy value in a specific frequency range.

Furthermore, at least one sequence of transformation coefficients, which have the highest energy values for the highest frequencies, is selected. A distribution of the frequencies is determined using the at least one selected sequence. The distribution of the frequencies is compared with a reference, wherein the transmission quality of the optical unit is determined using the comparison.

In this way, the transmission quality can be determined during operation of the camera system.

Moreover, in this way, the transmission quality can be determined in an easy manner which is cost-effective and gentle on resources. In particular, the proposed method, particularly with the evaluation in the frequency space, can be advantageous in relation to an evaluation of the spatially resolved information.

It is expedient if the optical unit has at least one optical component. An optical component can be a lens, a transparent disk, a mirror or suchlike. The transparent disk can be a safety screen, for instance. The optical unit preferably comprises a number of optical components.

The transmission quality of the optical unit is preferably a measure of the extent of the portion of light which penetrates the optical unit. In particular, the transmission quality of the optical unit can be a measure of what portion of incident light penetrates the optical unit.

The camera system can be sensitive to visible light and/or to non-visible light. Expediently the transmission quality of the optical unit is a measure of the extent of the portion of light which can be detected for the camera system and penetrates the optical unit.

If the optical unit has at least one lens and/or at least one transparent disk, the transmission quality is preferably dependent on the degree of transmission of the at least one lens and/or the at least one disk.

If the optical unit has a number of optical components, the transmission quality is preferably dependent on the degree of transmission of the medium between the optical components.

If the optical unit has at least one mirror, the transmission quality is preferably dependent on the degree of reflection of the at least one mirror.

The determined transmission quality can be used as a measure of a degree of contamination and/or degree of wear of the optical unit of the camera system.

A need to service the optical unit, in particular for the purpose of cleaning, polishing and/or replacement of at least one of the optical components of the optical unit, can be derived on the basis of the determined transmission quality. Furthermore, servicing of the optical unit can be planned in advance on the basis of the determined transmission quality.

The frequency transformation can be carried out within the scope of an image and/or video compression.

The at least one image need not be indicated for the proposed method. In particular, a back transformation is not required for the proposed method.

The spatially resolved information of the at least one image is preferably spatially resolved brightness information.

The image can be a color image. It is preferred if the image is shown by means of the brightness chromacity color model. The image can be present in the brightness chromaticity color space or be transformed into this, for instance. Furthermore, the image can be a grayscale image.

As mentioned already above, in the inventive method that at least one sequence of transformation coefficients is selected which has the highest energy values for the highest frequencies.

Logically the transformation coefficients are present in a respective sequence sorted in each case according to the frequency range, in particular sorted in ascending order according to the frequency range. It is preferred if, within a respective sequence, a transformation coefficient for a frequency range at higher frequencies follows on from a transformation coefficient for a frequency range at low frequencies.

It is advantageous if the at least one longest sequence of transformation coefficients is selected when the at least one sequence of transformation coefficients is selected.

Preferably, that transformation coefficient which does not equate to zero and is followed by, if at all, only one or more transformation coefficient(s), in particular for (a) frequency range(s) with higher frequencies, in brief: for higher frequencies which is/are equal to zero, applies as the last transformation coefficient of a sequence.

In other words: only transformation coefficients which do not equate to zero and/or for which there is at least one transformation coefficient for higher frequencies which does not equate to zero preferably form part of the sequence.

If a number of sequences are the same length, those sequences can preferably be selected, the last transformation coefficients of which are the highest in terms of amount.

With the selection of the at least one sequence of transformation coefficients, those transformation coefficients which originate from a shared counterdiagonal can furthermore be added to a sum in terms of amount. The at least one sequence of transformation coefficients which has the most sums is preferably selected. If the number of sums is the same, then the at least one sequence of transformation coefficients is preferably selected, the last sum of which is the highest.

A number as to how many sequences of transformation coefficients are to be selected is preferably predetermined.

As already mentioned above, a distribution of the frequencies is determined according to the invention by using the at least one selected sequence.

To determine the distribution of the frequencies, those transformation coefficients of the at least one selected sequence, which transformation coefficients apply in each case to the same frequency ranges, can be added together in terms of amount. For instance, the sum of the transformation coefficients for a respective frequency range can be used in each case as a measure of the frequency of occurrence of the respective frequencies.

To determine the transformation coefficients, quantification coefficients can be employed/used. In particular, the transformation coefficients can be quantified transformation coefficients.

If quantification coefficients were used to determine the transformation coefficients, the quantification coefficients can be taken into account with the comparison of the distribution of the frequencies with a reference.

Furthermore, the transformation coefficients can be unquantified transformation coefficients.

As already mentioned above, in accordance with the invention the distribution of the frequencies is compared with a reference, wherein the transmission quality of the optical unit is determined using the comparison.

If the number of specific high frequencies lies below a predetermined minimal value in the distribution of the frequencies, for instance, the transmission quality of the optical unit can be determined to be inadequate.

In other words, the reference can be a predetermined minimal value of the portion of specific high frequencies. In this case the comparison can be a threshold decision, for instance.

If the distribution of the frequencies in relation to the reference is moved at least by a specific degree to lower frequencies, for instance, the transmission quality of the optical unit can be determined as inadequate.

In this case, the comparison can be a threshold decision. Furthermore, the comparison can be carried out using a self-learning system, in particular a neural network. Further forms of the comparison are possible.

The reference can be a reference distribution. The reference distribution was preferably determined using a reference image of the same camera system.

Furthermore, the reference may have been determined on the basis of such a reference distribution. In other words, the reference on the basis of a reference distribution, which was determined using a reference image of the same camera system.

The reference image may have been recorded at an earlier point in time than the afore-cited at least one image of the camera system.

The scene imaged by the camera system during the recording of the at least one image is preferably at least essentially the same as that during the recording of the reference image.

In a preferred embodiment of the invention, the step of transforming spatially resolved information of at least one image of the camera system and the step of selecting the sequences of transformation coefficients are repeated several times for a number of images recorded within a predetermined time interval.

In other words, spatially resolved information in each case of at least one image of the camera system is preferably transformed section by section, using a frequency transformation, for a number of images recorded within the predetermined time interval, so that a sequence of transformation coefficients is determined for each section of the respective at least one image, wherein a respective transformation coefficient is a measure of an energy value in a specific frequency range in each case. In other words, at least one sequence of transformation coefficients, which has the highest energy values for the highest frequencies, is selected preferably for a number of images recorded within the predetermined time interval, in particular from the sequences of transformation coefficients present for the respective image.

An averaged frequency distribution is preferably determined for the number of images recorded within the predetermined time interval using the selected sequences of transformation coefficients.

The averaged frequency distribution is expediently compared with the reference, wherein the transmission quality of the optical unit is determined using the comparison.

The time interval can comprise a number of hours and/or a number of days. In this way the influence on the frequency distribution of brightness fluctuations due to the weather and/or due to the time of day can be reduced.

If the camera system records a number of images, it is advantageous if the scene imaged by the camera system remains at least substantially unchanged when the number of images is recorded. In particular, it is advantageous if the camera system is/remains directed at the same scene, in particular at the same object, during the recording of the number of images. In particular, an alignment of the camera system does not change during the recording of the number of images.

During the recording of the number of images, changes to the brightness and/or changes in the background, such as for instance a bird flying through the image, a plane flying through the image and/or changing cloud formations, are possible. During the recording of the number of images, changes to the transmission quality of the optical unit, such as for instance on account of contamination and/or wear, are moreover possible.

The number of images can be a number of images, the spatially resolved information of which is transformed. Furthermore, one of the number of images can be the previously cited reference image.

The at least one image of the camera system can be used to monitor a component of a technical unit. In particular, the component to be monitored can be imaged in the scene.

For instance, the sequences of transformation coefficients for the sections of the at least one image within a signal can be transmitted from the camera system to a receiving unit. The at least one sequence of transformation coefficients to be selected is selected and filtered from the signal. Furthermore, the distribution of the frequencies can be determined in particular using the at least one selected and filtered sequence of transformation coefficients.

The signal can be a compressed video stream, for instance.

Using the proposed method, it is possible to dispense with a back transformation of the transformation coefficients already present in the compressed video stream back to spatially resolved information.

The frequency transformation can be a Fourier transformation, for instance. Furthermore, the frequency transformation can be a wavelet transformation, for instance.

It is advantageous if the frequency transformation is a cosine transformation. In particular, the frequency transformation can be a discrete cosine transformation or an integer cosine transformation.

Expediently, a need to service the optical unit for the purpose of cleaning, polishing and/or replacement of at least one of the optical components of the optical unit is determined on the basis of the determined transmission quality.

For instance, the determined transmission quality can be inadequate. In the case of an inadequate transmission quality, a need to service the optical unit is preferably ascertained. For instance, with the servicing of the optical unit, a cleaning, polishing and/or replacement can take place of at least one of the optical components of the optical unit.

For instance, the determined transmission quality may be adequate. In the case of an adequate transmission quality, servicing of the optical unit is preferably not required.

Further gradings of the determined transmission quality are possible. For instance, the determined transmission quality can be moderate. In the case of a moderate transmission quality, it can be ascertained for instance that the need to service the optical unit is approaching.

Furthermore, the invention is directed at an evaluation unit for determining a transmission quality of an optical unit of a camera system.

The evaluation unit is designed in accordance with the invention to select at least one sequence of transformation coefficients, having the highest energy values for the highest frequencies, from a number of sequences of transformation coefficients which have been generated on the basis of spatially resolved information of at least one image of the camera system using a frequency transformation such that a sequence of transformation coefficients is determined for each section of the at least one image, wherein a respective transformation coefficient is a measure of an energy value in a specific frequency range in each case.

Moreover, the evaluation unit is designed to determine a distribution of the frequencies using the at least one selected sequence.

Furthermore, the evaluation unit is designed to compare the distribution of the frequencies with a reference and to determine the transmission quality of the optical unit using the comparison.

The evaluation unit can be used to carry out the afore-described method.

The evaluation unit can have a filter element. The filter element is preferably designed to select and filter the at least one sequence of transformation coefficients to be selected from a video stream which is transmitted from the camera system to a receiving unit.

The filter element can be e.g. a proxy, which is interposed in particular between the camera system and the receiving unit. Furthermore, the filter element can also be part of the camera system or the receiving unit.

The receiving unit can be a video recorder, for instance. Other receiving units are also conceivable, however.

Furthermore, the invention is directed at a system with a camera system and the previously cited evaluation unit and/or one of its developments.

Expediently, the camera system comprises an optical unit, in particular the previously cited optical unit. The optical unit preferably has at least one optical component.

The camera system is preferably designed to record one image or a number of images with spatially resolved information.

Furthermore, it is preferred if the camera system is designed to transform spatially resolved information of at least one image of the camera system, in particular of at least one of the recorded images, using a frequency transformation section by section, so that a sequence of transformation coefficients is determined for each section of the at least one image.

Expediently, a respective transformation coefficient is in each case a measure of an energy value in a specific frequency range.

Furthermore, the invention is directed at a use of the previously cited method and/or the preciously cited evaluation unit and/or the previously cited system or one of its developments to determine a degree of contamination and/or a degree of wear of a transparent safety screen of the optical unit of the camera system.

With the use, it can be assumed, for instance, that contamination and/or wear of other optical components of the optical unit is negligible compared with contamination and/or wear of the safety screen.

In particular, the camera system can be attached to a vehicle. For instance, the camera system can be attached to the outside of the vehicle.

The vehicle can be a rail vehicle, for instance.

For instance, the camera system can be used to monitor a component of the vehicle, in particular of the rail vehicle. The component can be a pantograph of the rail vehicle, for instance.

If the camera system is attached to a vehicle, the comparison can at least take place on the land side. In particular, the transformation coefficients and/or the distribution of the frequencies can be transmitted by the vehicle to the land side using a data link. The data link is expediently a wireless data link.

The previous description given of advantageous embodiments of the invention contains numerous features which are reproduced in the individual subclaims partially to form several combined. These features can however expediently also be considered individually and combined to form useful further combinations. In particular, these features are in each case individual and can be combined in any suitable combination with the inventive method, the inventive evaluation unit, the inventive system and the inventive use. Method features are also considered, concretely formulated, to be a property of the corresponding device unit and vice versa.

Even if some terms are used in the description or in the claims in the singular or in conjunction with a numeral in each case, the scope of the invention for these terms should not be restricted to the singular or the respective numeral.

The afore-described properties, features and advantages of this invention and the manner in which these are achieved will become clearer and more intelligible in conjunction with the following description of the exemplary embodiments, which are explained in more detail in conjunction with the drawings. The exemplary embodiments are used to explain the invention and do not restrict the invention to the combination of features specified therein, also not in respect of functional features. Moreover, features of any exemplary embodiment which are suited thereto can also be considered explicitly in isolation, removed from an exemplary embodiment, introduced into another exemplary embodiment for its expansion and combined with any one of the claims.

BRIEF DESCRIPTION OF THE SEVERAL VIEWS OF THE DRAWING

FIG. 1 a flow chart for schematic representation of the inventive method,

FIG. 2 a system with a camera system and an evaluation unit for carrying out the inventive method according to FIG. 1, FIG. 3 a diagram which indicates a distribution of the frequencies which were determined using a selection of sequences of transformation coefficients, wherein the sequences of transformation coefficients were generated on the basis of spatially resolved information of at least one image of the camera system using a frequency transformation, and FIG. 4 a diagram which shows a reference distribution.

DETAILED DESCRIPTION OF THE INVENTION

Figure 3:
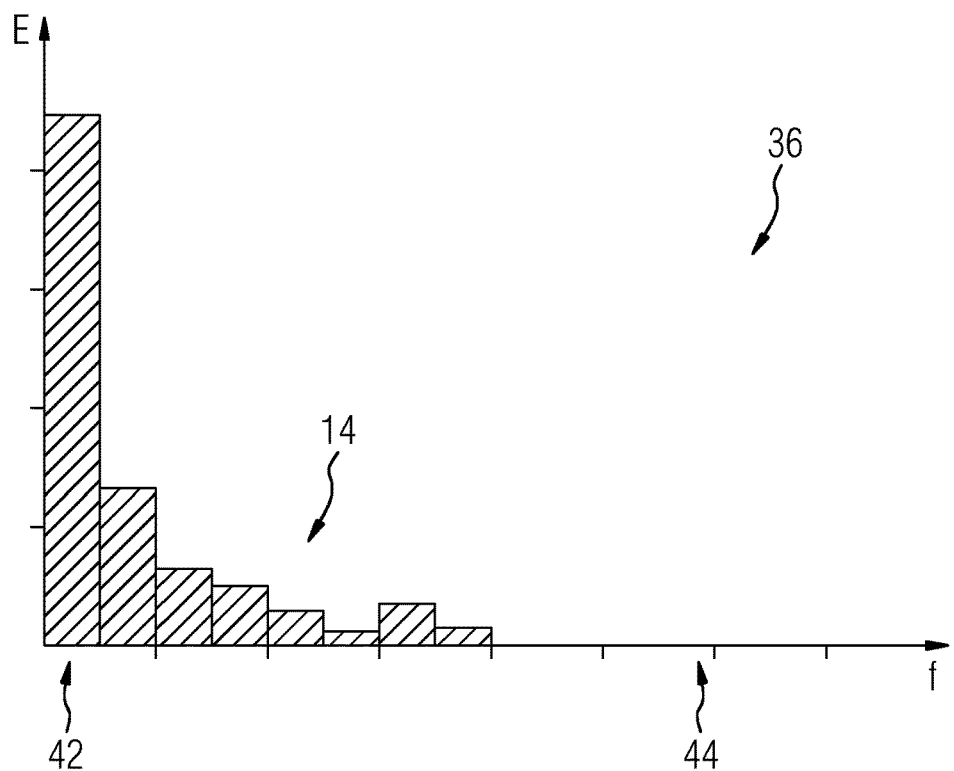

FIG. 1 shows a flow chart 2 for schematically representing the inventive method for determining a transmission quality of an optical unit 25 of a camera system 24 (cf. FIG. 2). The optical unit 25 has at least one optical component.

With the method, spatially resolved information 4 of at least one image of a camera system 24 is present. The spatially resolved information 4 relates to spatially resolved brightness information of the at least one image.

In association with FIG. 1, the method is described using spatially resolved information 4 of a single image.

With the method, the spatially resolved information 4 of the image is transformed section by section using a frequency transformation 6, so that a sequence 8 of transformation coefficients is determined for each section of the image.

To determine the sequences 8 of transformation coefficients, the spatially resolved information 4 of any section is transformed into the frequency space by means of a Fourier transformation 6 and can then be quantified using quantification coefficients. The coefficients of the resulting matrix are then sorted according to their frequency. In order to sort the coefficients, the matrix is run through in a zigzag fashion along its counterdiagonal. A sequence of transformation coefficients results for each section. The transformation coefficients are present in the respective sequence 8 according to the frequency f.

A respective transformation coefficient is in each case a measure of an energy value in a specific frequency range.

The greater a respective transformation coefficient in a specific frequency range, the greater therefore the portion of this frequency range in the respective section of the image.

Furthermore, at least one sequence 8 of transformation coefficients, having the highest energy values for the highest frequencies f, is selected (selection 10) in particular from the many sequences 8 for the one image. In this example, a number of such sequences 8 of transformation coefficients is selected. For instance, ten sequences of transformation coefficients can be selected, wherein these ten sequences 8 have the highest energy values for the highest frequencies f.

The transformation coefficients are present in a respective sequence 8 sorted in ascending order according to the frequency range.

To this end, one example of quantified matrices is provided, on the basis of which a sequence 8 of transformation coefficients is determined in each case:

$$\begin{bmatrix} 78 & 11 & 8 & 3 & 0 & 0 & 0 & 0 \\ 2 & 0 & 0 & 0 & 0 & 0 & 0 & 0 \\ 5 & 0 & 0 & 0 & 0 & 0 & 0 & 0 \\ 0 & 0 & 0 & 0 & 0 & 0 & 0 & 0 \\ 1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \text{Matrix a}$$

$$\begin{bmatrix} 92 & 12 & 6 & 3 & 0 & 0 & 0 & 0 \\ -3 & 0 & 0 & 0 & 0 & 0 & 0 & 0 \\ 4 & 1 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \text{Matrix b}$$

$$\begin{bmatrix} 80 & 10 & 5 & 3 & 0 & 0 & 0 & 0 \\ 2 & 0 & 0 & 0 & 0 & 0 & 0 & 0 \\ 4 & -3 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} \text{Matrix c}$$

On the basis of these matrices, the subsequent sequences 8 of transformation coefficients (sequences a, b, c) can be determined by way of example:

Sequence a: [78, 11, 2, 5, 0, 8, 3, 0, 0, 0, 1]
Sequence b: [92, 12, −3, 4, 0, 6, 3, 0, 1]
Sequence c: [80, 10, 2, 4, 0, 5, 3, 0, −3]

To select the at least one sequence 8 of transformation coefficients which has the highest energy values for the highest frequencies 7, the following can ensue:

Sequence a is longer than sequence b or sequence c, therefore sequence a has a transformation coefficient (namely the last in the sequence) in a frequency range with higher frequencies than sequence b or c. Consequently, sequence a in this example has the highest energy values for the highest frequencies. A frequency portion with the same frequencies is conversely missing in sequences b and c.

Sequences b and c are the same length. In other words sequence b and sequence c in each case have the last transformation coefficient in a frequency range with equally high frequencies.

The amount of a transformation coefficient is a measure of an energy value in a specific frequency range. The amount of the last transformation coefficient of the sequence c is higher than the amount of the last transformation coefficient in sequence b. Consequently, in this example sequence c has the higher energy value for the same highest frequencies (i.e. for the same highest frequency range) of the sequence 8.

With the selection the longest sequences 8 of transformation coefficients are selected. If sequences 8 of the same length are present, the amounts of the transformation coefficients are therefore compared, starting with the last transformation coefficient.

To select the at least one sequence 8 of transformation coefficients, which has the highest energy values for the highest frequencies f, the following can alternatively ensue:

With the selection of the at least one sequence 8 of transformation coefficients, those transformation coefficients which originate from a shared counterdiagonal can be added to a sum in terms of amount.

For the sequences 8 (a, b, c) specified by way of example above, the following sums result by way of example:

Sums of sequence a: [78; 13; 13; 3; 1]
Sums of sequence b: [92; 15; 10; 4]
Sums of sequence c: [80; 12; 9; 6]

The sequence a of transformation coefficients has the most sums. Consequently, sequence a in this example has the highest energy values for the highest frequencies.

The number of sums is the same for sequences b and c. In other words, sequence b and sequence c have in each case the last transformation coefficients, which originate from a shared counterdiagonal, in a frequency range with equally high frequencies.

The last sum of sequence c is greater than the last sum of sequence b. Consequently, in this example sequence c has the higher energy value for the same highest frequency range.

The at least one sequence 8 of transformation coefficients, which has the most sums, can be selected during the selection of the at least one sequence 8 of transformation coefficients. If the number of sums is the same, then the at least one sequence 8 of transformation coefficients can be selected, the last sum of which is the highest.

Using the selected sequences 8, a distribution 14 of the frequencies f (cf. FIG. 3) is determined (determination 12). In order to determine 12 the distribution 14 of the frequencies f, the transformation coefficients of the selected sequences 8 can be added together in terms of amount for the respective frequency ranges, for instance (cf. FIG. 3).

Figure 4:
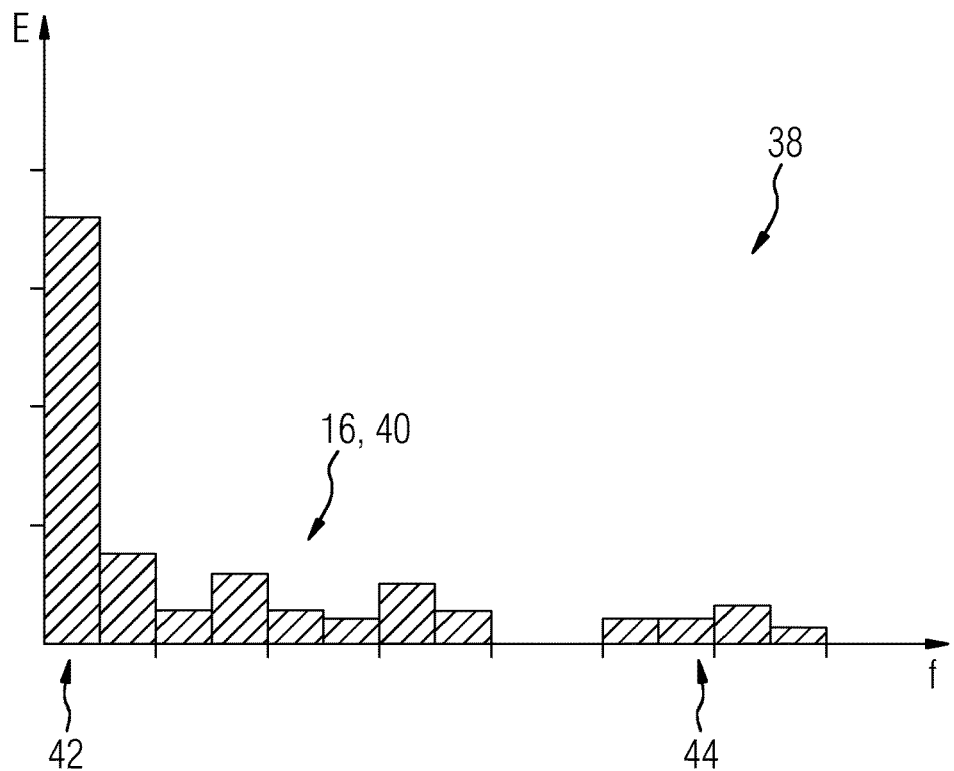

The distribution 14 of the frequencies f is compared with a reference 16 (cf. FIG. 4) (comparison 18), wherein the transmission quality 20 of the optical unit 25 of the camera system 24 is determined using the comparison 18 (cf. FIG. 4). With the comparison 18, the quantification coefficients which were used when determining the transformation coefficients can be taken into account.

FIG. 2 shows a schematic representation of a system 22 with a camera system 24 and an evaluation unit 26. In this example, the system 22 moreover comprises a receiving unit 28.

The camera system 24 comprises an optical unit 25. The optical unit 25 has at least one optical component, in general a number of optical components. An optical component can be a lens and/or a mirror, but also e.g. a protective screen. A protective screen can be used to protect a lens or a mirror from contamination, damage, etc.

The camera system 24 is preferably the camera system cited in FIG. 1. In particular, the system 22 can be used to carry out the method described in association with FIG. 1.

The camera system 24 records at least one image. In this example the camera system 24 records a number of images, in particular in the form of a video.

A component of a technical unit (not shown) is monitored by means of the camera system 24. The camera system 24 is permanently directed at a specific scene with the component to be monitored. The alignment of the camera system with respect to the component does not change.

This can ensure that the scene imaged by the camera system 24 remains at least essentially unchanged during the recording of a number of images.

The camera system 24 is connected to the receiving unit 28 by way of a data link 30.

The recorded images are compressed by the camera system 24 by means of a video compression. The frequency transformation 6 cited in FIG. 1 takes place within the scope of this video compression. For instance, the frequency transformation 6 can be a cosine transformation.

Since this is a video compression, the step of transforming spatially resolved information 4 of at least one image of the camera system 24 is repeated several times within a predetermined time interval.

With the video compression, a compressed video stream is produced, which has the sequences 8 of transformation coefficients cited in FIG. 1.

The compressed video stream is transmitted by the camera system 24 via the data link 30 to the receiving unit 28.

The evaluation unit 26 comprises a filter element 32, which is designed to select and filter the sequences 8 of transformation coefficients to be selected from a compressed video stream, which is transmitted by the camera system 24 to a receiving unit 28.

The step of selecting the sequences of transformation coefficients is repeated several times within the predetermined time interval. For instance, sequences 8 of transformation coefficients can be selected and filtered within the predetermined time interval at different points in time in each instance.

In this example, the filter element 32 is embodied as a proxy and interposed between the camera system 24 and the receiving unit 28.

Furthermore, the evaluation unit 26 comprises a computer unit 34. The computer unit 34 is connected to the filter element 32 by way of a further data link 30.

The selected (and filtered) sequences 8 of transformation coefficients are transmitted by the filter element 32 via the further data link 30 to the computer unit 34 of the evaluation unit 26.

The computer unit 34 of the evaluation unit 26 is designed to determine the distribution 14 of the frequencies f (cf. FIG. 3) using the selected sequences 9, to compare the distribution 14 of the frequencies f with a reference 16 (cf. FIG. 4) and to determine the transmission quality 20 of the optical unit 25 of the camera system 24 using the comparison 18.

For instance, an averaged frequency distribution can be determined for the predetermined time interval by using the sequences 8 selected in the time interval as a distribution 14 of the frequencies f.

An interval of a number of hours or days can be predetermined as a time interval so that an influence of weather conditions and brightness fluctuations due to the time of day is reduced.

FIG. 3 shows a diagram 36, which shows a distribution 14 of the frequencies f by way of example. This can be an averaged frequency distribution.

The distribution 14 of the frequencies f was, as described under FIG. 1 and FIG. 2, determined using a selection of sequences 8 of transformation coefficients, wherein the sequences 8 of transformation coefficients were determined on the basis of spatially resolved information 4 of at least one image of a camera system 24 using a frequency transformation 6.

In order to determine the distribution 14 of the frequencies f, those transformation coefficients of the selected sequences 8, which transformation coefficients apply in each case to the same frequencies, i.e. the same frequency range, were added together in terms of amount.

Since an amount of a respective transformation coefficient is a measure of an energy value E in a specific frequency range, the sum of a number of transformation coefficients in terms of amount is in turn a measure of an energy value E.

In the diagram 36 the frequency f is plotted on the x-axis. The energy value E is plotted on the y axis.

The distribution 14 of the frequencies f is shown as a bar chart.

The highest energy value E is to be registered in the region 42 of the lowest frequencies f (shown to the far left in the drawing).

The distribution 14 of the frequencies f shown by way of example in the diagram 36 is compared with a reference 16 (cf. FIG. 4). In this example the reference 16 is a reference distribution 40.

FIG. 4 shows a diagram 38, which shows a reference distribution 40 by way of example.

The reference distribution 40 can be determined similarly to the distribution 14 of the frequencies f in FIG. 3, but using the spatially resolved information 4 of at least one reference image. The at least one reference image can be for instance the first image(s) recorded by means of the camera system 24 when monitoring the component. In particular, the scene imaged by the camera system 24 in the reference image is the same as in the determination of the at least one image cited in FIG. 1 and FIG. 2.

In the diagram 38, similarly to the diagram 36 in FIG. 3, the frequency f is plotted on the x-axis and the energy value E is plotted on the y axis. The reference distribution 40 is shown as a bar chart.

Here, too, the highest energy value E is to be registered in the region 42 of the lowest frequencies f (shown to the far left in the drawing). It is however to be ascertained that energy values E were determined (shown to the right in the drawing) in a region 44 with higher frequencies f, i.e. in higher frequency ranges, than in the diagram 36 in FIG. 3.

With the comparison of the distribution 14 of the frequencies f from FIG. 3 with the reference 16 embodied as the reference distribution 40 in FIG. 4, it is consequently ascertained that in the distribution 14 of the frequencies f, the portion of high frequencies f, i.e. of frequencies in the region 44, has dropped to zero.

With the comparison, it can be further ascertained that the distribution 14 of the frequencies f in relation to the reference distribution 40 has clearly moved to lower frequencies.

The transmission quality 20 of the optical unit 25 (cf. FIG. 2) is determined as inadequate on the basis of the comparison.

A need to service the optical unit 25, in which for instance at least one optical component of the optical unit 25 is cleaned, polished and/or replaced, is determined on the basis of the determined transmission quality 20. Since the determined transmission quality 20 is "inadequate", it is ascertained that the transmitting optical components of the camera system 24 require cleaning.

Although the invention has been illustrated and described in detail by the preferred exemplary embodiments, the invention is therefore not restricted by the disclosed examples and other variations can be derived by the person skilled in the art without departing from the scope of the invention.

The invention claimed is:

1. A method for determining a transmission quality of an optical unit of a camera system, the method comprising:
    transforming spatially resolved information of at least one image of the camera system section by section by using a frequency transformation, to determine a sequence of transformation coefficients for each section of the at least one image, with each respective transformation coefficient being a measure of an energy value in a specific frequency range;
    selecting at least one sequence of transformation coefficients having highest energy values for highest frequencies;
    determining a distribution of the frequencies by using the at least one selected sequence
    comparing the distribution of the frequencies with a reference;
    repeating the step of transforming spatially resolved information of at least one image of the camera system and the step of selecting the at least one sequence of transformation coefficients several times, for a plurality of images recorded within a predetermined time interval;
    determining an averaged frequency distribution by using the selected sequences of the transformation coefficients; and
    comparing the averaged frequency distribution with the reference, and determining the transmission quality of the optical unit by using the comparison.

2. The method according to claim 1, which further comprises providing the spatially resolved information of the at least one image as spatially resolved brightness information.

3. The method according to claim 1, which further comprises providing the transformation coefficients in a respective sequence each sorted in ascending order according to the frequency range.

4. The method according to claim 1, which further comprises selecting at least one longest sequence of transformation coefficients when selecting the at least one sequence of transformation coefficients.

5. The method according to claim 1, which further comprises determining the transmission quality of the optical unit as being inadequate, when a portion of specific high frequencies lies below a predetermined minimal value in the distribution of the frequencies.

6. The method according to claim 1, which further comprises determining the transmission quality of the optical unit as being inadequate, when the distribution of the frequencies in relation to the reference is moved at least by a specific degree to lower frequencies.

7. The method according to claim 1, which further comprises providing the reference as a reference distribution having been determined by using a reference image of an identical camera system, or the reference having been determined based on the reference distribution.

8. The method according to claim 1, which further comprises using the camera system to record a plurality of images, and keeping a scene imaged by the camera system at least substantially unchanged with the recording of the plurality of images.

9. The method according to claim 1, which further comprises:
transmitting the sequences of transformation coefficients for the sections of the at least one image within a signal from the camera system to a receiving unit;
selecting and filtering from the signal the at least one sequence of transformation coefficients to be selected; and
determining the distribution of the frequencies by using the at least one selected and filtered sequence of transformation coefficients.

10. The method according to claim 9, which further comprises providing the signal as a compressed video stream and selecting and filtering the at least one sequence of transformation coefficients to be selected from the compressed video stream.

11. The method according to claim 1, which further comprises determining a need to service the optical unit for at least one of cleaning, polishing or replacement of at least one optical component of the optical unit, based on the determined transmission quality.

12. The method according to claim 1, which further comprises determining at least one of a degree of contamination or a degree of wear of a transparent protective screen of the optical unit of the camera system.

13. The method according to claim 12, which further comprises attaching the camera system to an outside of a vehicle.

14. An evaluation unit for determining a transmission quality of an optical unit of a camera system, the evaluation unit configured:
to efficiently select at least one sequence of transformation coefficients, having highest energy values for highest frequencies, from a plurality of sequences of transformation coefficients, having been produced based on spatially resolved information of at least one image of the camera system by using a frequency transformation to determine a sequence of transformation coefficients for each section of the at least one image, with each respective transformation coefficient being a measure of an energy value in a specific frequency range;
to determine a distribution of the frequencies using the at least one selected sequence;
to compare the distribution of the frequencies with a reference;
to repeat the step of transforming spatially resolved information of at least one image of the camera system and the step of selecting the at least one sequence of transformation coefficients several times, for a plurality of images recorded within a predetermined time interval;
to determine an averaged frequency distribution by using the selected sequences of the transformation coefficients;
to compare the averaged frequency distribution with the reference; and
to determine the transmission quality of the optical unit by using the comparison.

15. The evaluation unit according to claim 14, which further comprises a filter element configured to select and filter the at least one sequence of transformation coefficients to be selected from a compressed video stream being transmitted from the camera system to a receiving unit.

16. The evaluation unit according to claim 14, wherein the evaluation unit is configured to determine at least one of a degree of contamination or a degree of wear of a transparent protective screen of the optical unit of the camera system.

17. The evaluation unit according to claim 16, wherein the camera system is attached to an outside of a vehicle.

18. A system, comprising:
a camera system and an evaluation unit according to claim 14;
the camera system configured:
to record one or more images with spatially resolved information; and
to transform the spatially resolved information of at least one image of the camera system section by section using a frequency transformation to determine a sequence of transformation coefficients for each section of the at least one image.

19. The system according to claim 18, wherein the camera system has an optical unit with a transparent protective screen having at least one of a degree of contamination or a degree of wear to be determined.

20. The system according to claim 19, wherein the camera system is attached to an outside of a vehicle.

* * * * *